US008669954B2

(12) United States Patent
Chou et al.

(10) Patent No.: US 8,669,954 B2
(45) Date of Patent: Mar. 11, 2014

(54) TOUCH PANEL

(75) Inventors: Hung-Wen Chou, Hsin-Chu (TW); Min-Feng Chiang, Hsin-Chu (TW); Jian-Shen Yu, Hsin-Chu (TW); Po-Yuan Liu, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 111 days.

(21) Appl. No.: 13/171,668

(22) Filed: Jun. 29, 2011

(65) Prior Publication Data

US 2012/0169630 A1  Jul. 5, 2012

(30) Foreign Application Priority Data

Dec. 30, 2010  (TW) .............................. 99147047 A

(51) Int. Cl.
*G09G 5/00*  (2006.01)
(52) U.S. Cl.
USPC .............................. 345/173; 345/87; 345/104
(58) Field of Classification Search
USPC .......................................... 345/173, 87, 104
See application file for complete search history.

(56) References Cited

U.S. PATENT DOCUMENTS

| 5,381,551 | A * | 1/1995 | Maeda et al. | 710/244 |
| 8,054,261 | B2 * | 11/2011 | Pak et al. | 345/87 |
| 2009/0295747 | A1 | 12/2009 | Hsieh et al. | |
| 2010/0110028 | A1 * | 5/2010 | Takahashi et al. | 345/173 |
| 2010/0302182 | A1 | 12/2010 | Wei et al. | |
| 2011/0141042 | A1 * | 6/2011 | Kim et al. | 345/173 |
| 2012/0050220 | A1 | 3/2012 | Liu et al. | |

FOREIGN PATENT DOCUMENTS

| CN | 101598862 | 12/2009 |
| CN | 101840094 | 9/2010 |
| CN | 101930320 | 12/2010 |
| CN | 101930320 A | 12/2010 |
| TW | 200949654 A | 12/2009 |

OTHER PUBLICATIONS

China Office Action issued Jul. 4, 2012.
Taiwan Patent Office, "Office Action", Sep. 17, 2013.

* cited by examiner

*Primary Examiner* — William Boddie
*Assistant Examiner* — Leonid Shapiro
(74) *Attorney, Agent, or Firm* — WAPT, PC; Justin King

(57) ABSTRACT

A touch panel includes a substrate, scan lines, data output lines, a signal processing unit and touch sensing units. Each touch sensing unit includes a sensing electrode, a reference capacitor, an output circuit and a reset circuit. The sensing electrode is disposed in a breach of the sensing electrode. The reference capacitor, the output circuit and the reset circuit are disposed on the substrate and in the breach. The output circuit, the reset circuit, the reference capacitor and the sensing electrode are electrically coupled to a reference point. The output circuit is configured to output touch signals to the corresponding data output line. The signal processing unit is configured to obtain electric potential of the data output line and perform a corresponding processing step. When the touch sensing unit is out of working, the reference point is reset to a predetermined electric potential.

6 Claims, 5 Drawing Sheets

TOUCH PANEL

FIELD OF TECHNICAL

The disclosure relates to an operation device, and more particularly to a touch panel.

BACKGROUND

With the development and progress of electronic technology, various human-machine interfaces are widely used in electronic devices. Touch panels are more humanized than other human-machine interfaces and have advantages of intuition and small volume. Therefore, touch panels are more and more popular. Common touch panels currently on the market include resistance type touch panels, capacitance type touch panels, surface acoustic wave type touch panels and infrared type touch panels and so on. The capacitance type touch panels are waterproof, anti-static, anti-glare, anti-scratching, anti-reflective, and fingerprint resistant. Besides, the capacitance type touch panels can achieve multi-touch sensing function. Therefore, the capacitance type touch panels have strong competitiveness. Moreover, the capacitance type touch panels include surface capacitance type touch panels and projected capacitance type touch panels. Compared with the surface capacitance type touch panels, the projected capacitance type touch panels have advantages of high durability and low drift phenomenon. Thus, the projected capacitance type touch panels are regarded as mainstream technology of the capacitance type touch panels in future.

FIG. 1 is a schematic view of a conventional touch panel. FIG. 2 is a schematic view of the touch panel of FIG. 1, showing a finger of a user touching the touch panel. FIG. 3 is a schematic view of a sensing module inside the touch panel of FIG. 1, wherein in order to clearly show relation between sensing electrodes, a part of the sensing electrodes is omitted. Referring to FIGS. 1 to 3, a conventional touch panel 100 includes a surface panel 110, a plurality of sensors 120, a plurality of scan lines S1, a plurality of data transmission lines DL1 and a controller 210. The sensors 120 are disposed on a bottom surface 112 of the surface panel 110, and the sensors 120 include a plurality of sensing electrodes 120$s$ and a plurality of driving electrodes 120$d$. The controller 210 provides scan signals and the scan signals are transmitted to the driving electrodes 120$d$ by the scan lines S1. The data transmission lines DL1 are configured to transmit sensing signals of the sensing electrodes 120$s$ to the controller 210 for calculating. When the touch panel 100 is touched by a finger of a user, a capacitance between the finger and the sensing electrodes 120$s$ is increased. Therefore, a touch position can be obtained according to variation of electrostatic capacitance of the sensing electrodes 120$s$.

However, in the touch panel 100, since a driving end is in series with the sensing electrodes 120$s$ of a sensing end, signals output from some of the sensing electrodes 120$s$ located at an end far away from the driving end are greatly decayed because of loading effect. Therefore, the sensing electrodes 120$s$ in current design are unable to be miniaturized. If the sensing electrodes 120$s$ are too small, variation of electrostatic capacitance of the sensing electrodes 120$s$ is also small. As a result, strength of touch signals is insufficient, and thereby a touch action cannot be distinguished.

SUMMARY OF DISCLOSURE

The disclosure provides a touch panel which can improve sensing resolution.

To achieve the above-mentioned advantage, the disclosure provides a touch panel including a substrate, a plurality of scan lines, a plurality of data output lines, a signal processing unit and a plurality of touch sensing units. The scan lines and the data output lines are disposed on the substrate, and the scan lines and the data output lines divide the substrate into a plurality of sensing regions. The signal processing unit is electrically coupled to the data output lines so as to obtain electric potential of the data output lines and performs a corresponding processing step. The signal processing unit outputs processed result. Each touch sensing unit is disposed in a corresponding sensing region of the sensing regions. Each touch sensing unit is electrically coupled to a corresponding scan line of the scan lines and a corresponding data output line of the data output lines. Each touch sensing unit is controlled whether to perform a touch sensing action by the corresponding scan line. At least one of the touch sensing units includes a sensing electrode, a reference capacitor, a first conducting line, a second conducting line, an output circuit and a reset circuit. The sensing electrode is disposed on the substrate and the sensing electrode has a breach. The first conducting line, the reference capacitor, the second conducting line, the output circuit and the reset circuit are disposed on the substrate and in the breach. The first conducting line is connected between a terminal of the reference capacitor and the sensing electrode, and a point on the first conducting line is selected as a reference point. The second conducting line is connected between another terminal of the reference capacitor and the corresponding scan line. The output circuit and the reset circuit are electrically coupled to the reference point. The output circuit is configured to output touch signals to the corresponding data output line. When the touch sensing unit is out of working, the reset circuit resets the reference point to a predetermined electric potential.

In one embodiment, when the touch sensing unit is controlled to perform the touch sensing action by the corresponding scan line, the output circuit determines whether to transmit the electric potential of the corresponding scan line to the corresponding data output line according to electric potential of the reference point.

In one embodiment, the output circuit includes a first transistor and a second transistor. The first transistor and the second transistor respectively have a gate, a first drain/source and a second drain/source. The gate of the first transistor is electrically coupled to the reference point. The first drain/source of the first transistor is electrically coupled to the corresponding scan line. The gate of the second transistor is electrically coupled to the corresponding scan line. The first drain/source of the second transistor is electrically coupled to the corresponding data output line. The second drain/source of the second transistor is electrically coupled to the second drain/source of the first transistor.

In one embodiment, the reset circuit includes a unilateral conducting component having a first terminal and a second terminal. The unilateral conducting component allows electric current to flow from the first terminal to the second terminal. The first terminal of the unilateral conducting component is electrically coupled to the reference point. The second terminal is electrically coupled to the corresponding scan line.

In one embodiment, the unilateral conducting component is implemented by a diode-connected transistor.

In the touch panel, since the output circuit can determine output signal level according to the electric potential of the reference point, an area of the sensing electrode can be reduced, and the sensing resolution can be promoted. Moreover, since the area of the sensing electrode is reduced, a disadvantage that a touch pen cannot be used as a touch component is eliminated.

DETAILED DESCRIPTION OF EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
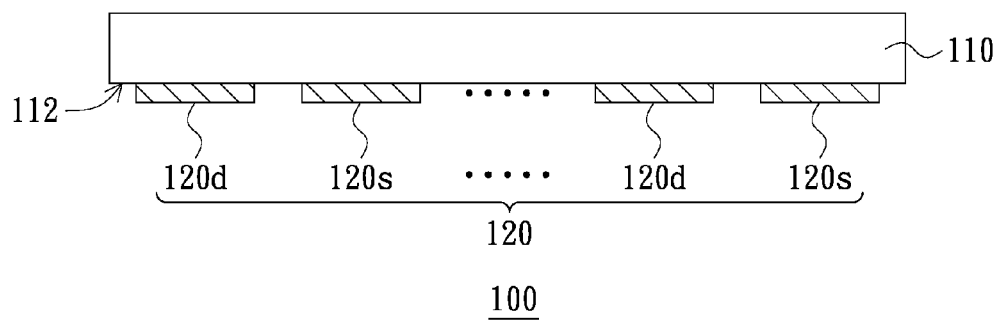
FIG. 1 is a schematic view of a conventional touch panel.
Figure 2:
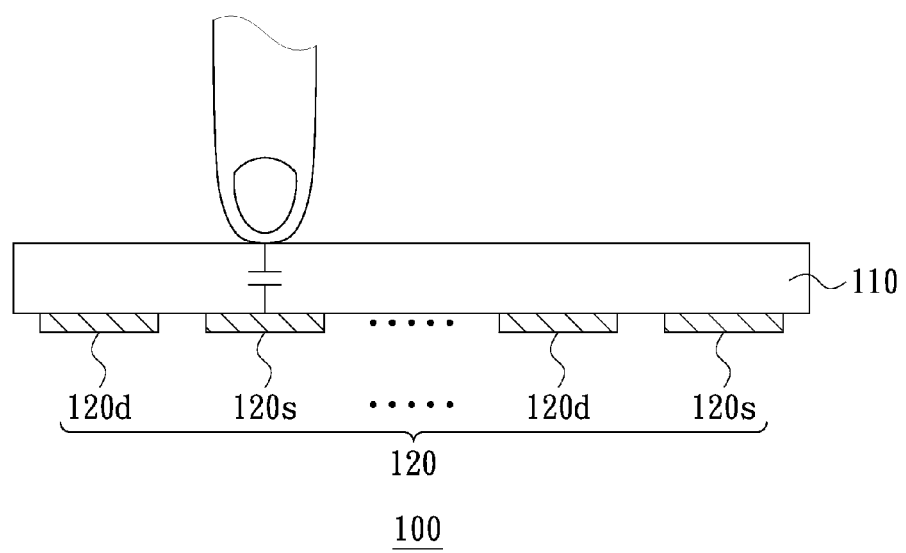
FIG. 2 is a schematic view of the touch panel of FIG. 1, showing a finger of a user touching the touch panel.
Figure 3:
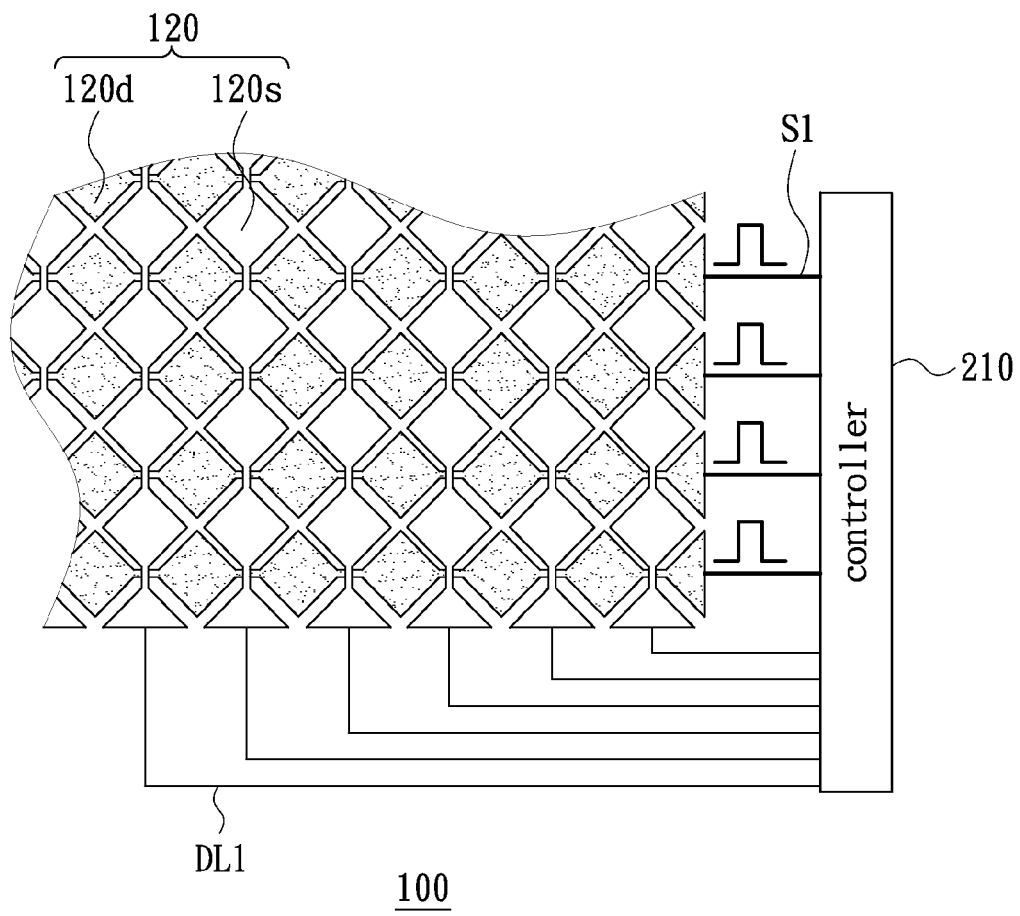
FIG. 3 is a schematic view of a sensing module inside the touch panel of FIG. 1.
Figure 4:
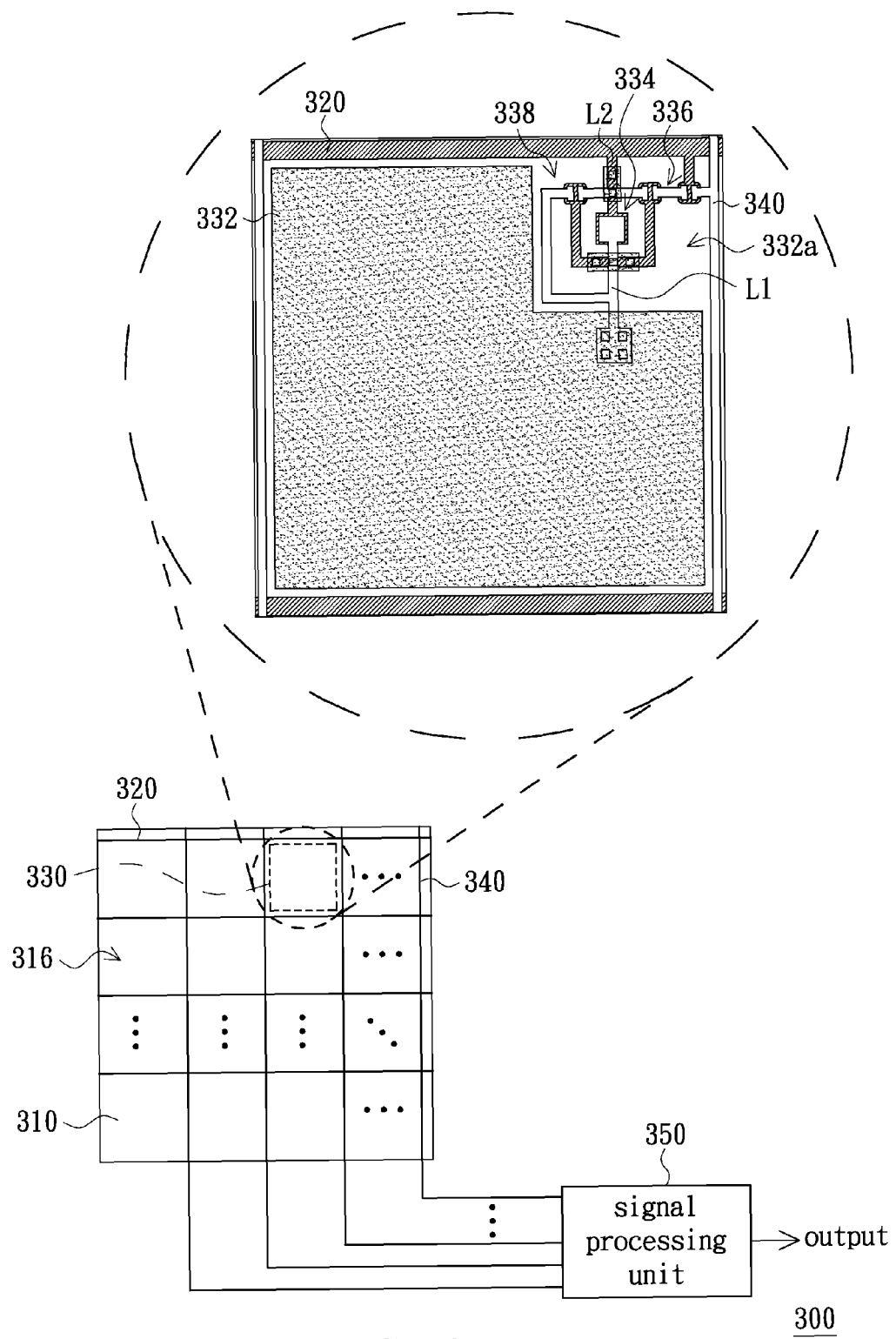
FIG. 4 is a schematic view of a touch panel according to an embodiment.
Figure 5:
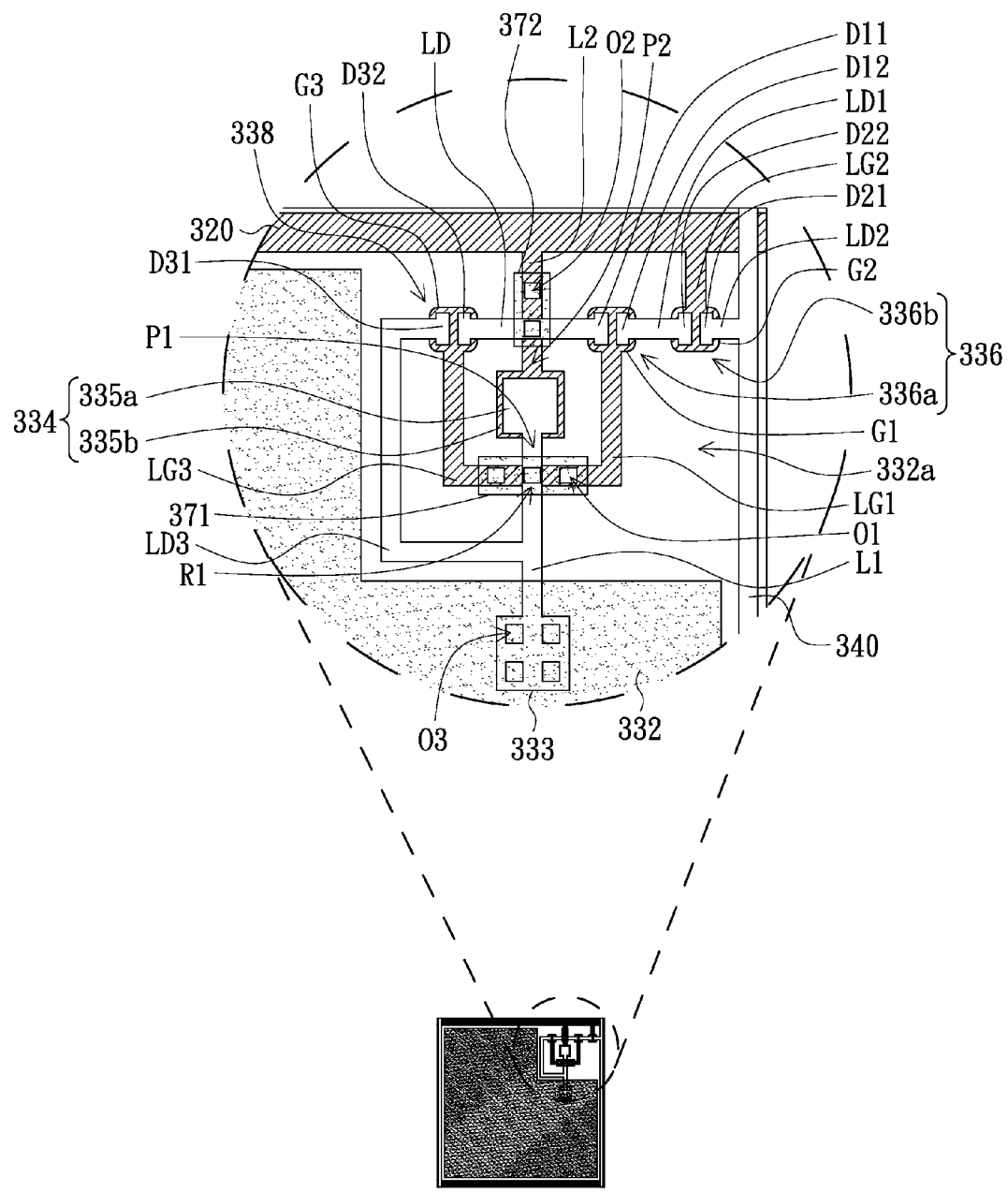
FIG. 5 is a partial enlarged, schematic view of a single sensing region of FIG. 4.
Figure 6:
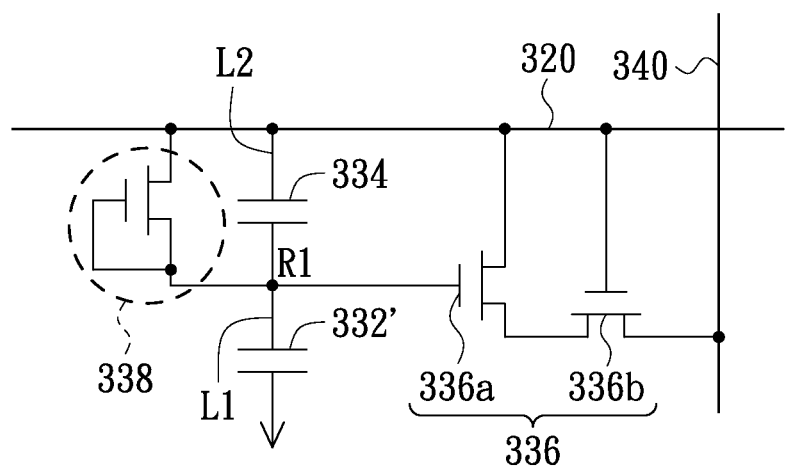
FIG. 6 is a schematic view of an equivalent circuit of the single sensing region of FIG. 4.

FIG. 4 is a schematic view of a touch panel according to an embodiment. FIG. 5 is a partial enlarged, schematic view of a single sensing region of FIG. 4. FIG. 6 is a schematic view of an equivalent circuit of the single sensing region of FIG. 4. Referring to FIGS. 4 to 6, a touch panel 300 of the embodiment includes a substrate 310, a plurality of scan lines 320, a plurality of touch sensing units 330, a plurality of data output lines 340 and a signal processing unit 350. The scan lines 320, the touch sensing units 330 and the data output lines 340 are disposed on the substrate 310. The scan lines 320 and the data output lines 340 divide the substrate 310 into a plurality of sensing regions 316. Each touch sensing unit 330 is disposed in a corresponding sensing region 316, and each touch sensing unit 330 is electrically coupled to a corresponding scan line 320 and a corresponding data output line 340. Furthermore, the signal processing unit 350 is electrically coupled to the data output lines 340 so as to obtain electric potential of the data output lines 340 and perform a corresponding processing step.

At least one of the touch sensing units 330 includes a sensing electrode 332, a first conducting line L1, a reference capacitor 334, a second conducting line L2, an output circuit 336 and a reset circuit 338. A terminal P1 of the reference capacitor 334 is connected to the sensing electrode 332 via the first conducting line L1. A point on the first conducting line L1 is selected as a reference point R1. Another terminal P2 of the reference capacitor 334 is connected to the corresponding scan line 320 via the second conducting line L2. More specifically, the reference capacitor 334 includes a metal layer 335a and a metal layer 335b overlapped with the metal layer 335a, and an insulation layer (not shown) is disposed between the first metal layer 335a and the metal layer 335b. The terminal P1 of the metal layer 335a is connected to the sensing electrode 332 via the first conducting line L1, and the terminal P2 of the metal layer 335b is connected to the corresponding scan line 320 by the second conducting line L2. Additionally, each sensing electrode 332 has a breach 332a, and the first conducting line L1, the reference capacitor 334, the second conducting line L2, the output circuit 336 and the reset circuit 338 are disposed in the breach 332a. That is, orthographic projections of components such as the sensing electrode 332, the first conducting line L1, the reference capacitor 334, the second conducting line L2, the output circuit 336 and the reset circuit 338 projecting on the substrate 310 are not overlapped with each other.

Each touch sensing unit 330 is controlled whether to perform a touch sensing action by the corresponding scan line 320. When the corresponding scan line 320 controls the touch sensing unit 330 to perform the touch sensing action, the output circuit 336 determines whether to transmit the electric potential of the corresponding scan line 320 to the corresponding data output line 340 according to the electric potential of the reference point R1. When the touch sensing unit 330 is out of working, the reset circuit 338 resets the reference point R1 to a predetermined electric potential.

In the present embodiment, the sensing electrode 332 is, for example, a transparent electrode. Material of the transparent electrode can be, but not limited to, indium tin oxide. The shape of the sensing electrode 332 of the present embodiment is, for example, rectangle having the breach 332a. The breach 332a of the sensing electrode 332 can also be rectangular, and the breach 332a can be disposed in a corner of the sensing electrode 332. In other embodiments, the shape of the sensing electrode 332, the shape of the breach 332a or the position of the breach 332a relative to the sensing electrode 332 can be changed according to design requirements. Furthermore, the output circuit 336, for example, includes a first transistor 336a and a second transistor 336b. The first transistor 336a and the second transistor 336b have gates G1, G2, first drain/sources D11, D21 and second drain/sources D12, D22. The gate G1 of the first transistor 336a is electrically coupled to the reference point R1, and the first drain/source D11 of the first transistor 336a is electrically coupled to the corresponding scan line 320 via the second conducting line L2. The electric potential of the reference point R1 can turn on or turn off the first transistor 336a. In addition, the gate G2 of the second transistor 336b is electrically coupled to the corresponding scan line 320. The first drain/source D21 of the second transistor 336b is electrically coupled to the corresponding data output line 340, and the second drain/source D22 of the second transistor 336b is electrically coupled to the second drain/source D12 of the first transistor 336a.

Furthermore, in the present embodiment, the reset circuit 338 is, for example, a unilateral conducting component. The symbol 338 represents the unilateral conducting component below. The unilateral conducting component 338 has a first terminal and a second terminal, and the unilateral conducting component 338 allows electric current to flow from the first terminal to the second terminal. The first terminal of the unilateral conducting component 338 is electrically coupled to the reference point R1. The second terminal is electrically coupled to the corresponding scan line 320, and the unilateral conducting component 338 can be a diode or implemented by a diode-connected transistor as shown in FIG. 6. The scan line 320 is a control signal input end and is configured to control the first transistor 336a, the second transistor 336b and the unilateral conducting component 338.

In the present embodiment, the second conducting line L2, the metal layer 335b of the reference capacitor 334 and the scan line 320, for example, belong to a first metal layer. The gates G3, G1, G2 of the unilateral conducting component 338, the first transistor 336a and the second transistor 336b, and conducting lines LG3, LG1, LG2 thereof also belong to the first metal layer. Furthermore, the first conducting line L1, the metal layer 335a of the reference capacitor 334 and the data output lines 340, for example, belong to a second metal layer. Moreover, the first drain/sources D31, D11, D21 and the second drain/sources D32, D12, D22 of the unilateral conducting component 338, the first transistor 336a and the second transistor 336b, and conducting lines LD3, LD1, LD2, LD thereof also belong to the second metal layer.

Since an insulation layer (not shown) is disposed between the first metal layer and the second metal layer, and between the second metal layer and the sensing electrode 332, the gates G1, G3 of the first transistor 336a and the unilateral conducting component 338 are electrically coupled to the reference point R1 of the first conducting line L1 through a transparent electrode 371 and a plurality of via holes O1. Further, the terminal P1 of the reference capacitor 334 is electrically coupled to the gates G1, G3 of the first transistor 336a and the unilateral conducting component 338. Similarly, the conducting line LD is electrically connected to the second conducting line L2 connected to the scan line 320 through a transparent electrode 372 and a plurality of via holes O2. Further, the second drain/source D32 of the unilateral conducting component 338, the first drain/source D11 of the first transistor 336a and the terminal P2 of the reference capacitor 334 are electrically coupled to the scan line 320.

In addition, the transparent electrodes 371, 372 are, for example, simultaneously formed with the sensing electrode 332. Furthermore, an end of the first conducting line L1 close to the sensing electrode 332 has a metal layer 333, and the metal layer 333, for example, belongs to the second metal layer. The sensing electrode 332 is electrically connected to the metal layer 333 through a via hole O3, so that the sensing electrode 332 is electrically coupled to the reference point R1. In such way, the sensing electrode 332 can be regarded as a modulating capacitor 332' having a terminal connected to the reference point R1, and capacitance of the modulating capacitor 332' varies according to whether the sensing electrode 332 is touched by the finger of the user or a touch pen.

The scan lines 320 send out scan signals so as to perform the touch sensing action. When the touch sensing units 330 do not sense a touch action, the electric potential of the reference point R1 is a high electric potential, and the first transistor 336a is in a state of turning on. The first drain/source D11 of the first transistor 336a transmits the electric potential of the corresponding scan lines 320 to the second drain/source D12 of the first transistor 336a, so as to promote the electric potential of the drain/source D12 of the first transistor 336a. Moreover, by turning on the second transistor 336b, the electric potential of the second drain/source D22 of the second transistor 336b is transmitted to the first drain/source D21 of the second transistor 336b. As such, electric potential of an output terminal of the first drain/source D21 of the second transistor 336b connected with the data output line 340 is promoted, and the output end of the first drain/source D21 sends out a high electric potential to the data output line 340.

If an object touches the touch sensing unit 330, capacitance effect between the sensing electrode 332 and the object reduces the electric potential of the reference point R1, thereby turning off the first transistor 336a. Therefore, the electric potential of the second drain/source D12 of the first transistor 336a can not be promoted, and thereby the first drain/source D21 and the second drain/source D22 of the second transistor 336b continuously keep a low electric potential and finally transmit the low electric potential to the data output lines 340.

The signal processing unit 350 is configured to obtain the electric potential of the data output lines 340 and perform a corresponding processing step. After that, the signal processing unit 350 outputs processed result to a controller (not shown). Moreover, when the scan lines 320 send out the scan signals to control the touch sensing units 330 to stop the touch sensing action, the reset circuit 338 resets the reference point R1 to the predetermined electric potential.

In the touch panel 300 of the present embodiment, whether the electric potential of the corresponding scan line 320 is transmitted to the corresponding data output line 340 or not is determined by the electric potential of the reference point R1. Therefore, the output circuit 336 works similarly as an analog to digital circuit. That is, when the user touches the sensing electrode 332, the electric potential of the reference point R1 is reduced. Thereby, the first transistor 336a of the output circuit 336 is turned off, and the output circuit 336 outputs the low electric potential. When the sensing electrode 332 does not sense the touch action, the electric potential of the reference point R1 is the high electric potential. Thereby, the first transistor 336a of the output circuit 336 is turned on, and the output circuit 336 outputs the high electric potential to the data output lines 340. The signal processing unit 350 obtains the electric potential of the data output lines 340 and performs the corresponding processing step. Then, the signal processing unit 350 outputs the processed result to the controller for calculating, so that the touch position can be distinguished.

In summary, since the touch panel of the embodiment has the output circuit disposed in the breach of the sensing electrode, the output circuit can enlarge the difference of output signals. Even if a size of the sensing electrode is reduced, the touch sensing action can also be performed. Furthermore, when the size of the sensing electrode is reduced, sensing resolution of the touch panel can be promoted. Additionally, even if variation of capacitance caused by the sensing electrode is small because of an area of the sensing electrode being reduced, the output signals can also be enlarged by the output circuit. Therefore, a disadvantage that a touch pen cannot be used as a touch component is eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch panel comprising:
   a substrate;
   a plurality of scan lines disposed on the substrate;
   a plurality of data output lines disposed on the substrate, the scan lines and the data output lines dividing the substrate into a plurality of sensing regions;
   a signal processing unit electrically coupled to the data output lines so as to obtain electric potential of the data output lines and perform a corresponding processing step, and the signal processing unit outputting processed result; and
   a plurality of touch sensing units, each touch sensing unit being disposed in a corresponding sensing region of the sensing regions, each touch sensing unit being electrically coupled to a corresponding scan line of the scan lines and a corresponding data output line of the data output lines, each touch sensing unit being controlled whether to perform a touch sensing action by the corresponding scan line, and at least one of the touch sensing units comprising:
      a sensing electrode disposed on the substrate, and the sensing electrode having a breach;
      a reference capacitor disposed on the substrate and in the breach;

a first conducting line connected between a terminal of the reference capacitor and the sensing electrode, and a point on the first conducting line being selected as a reference point;

a second conducting line connected between another terminal of the reference capacitor and the corresponding scan line;

an output circuit disposed on the substrate and in the breach, and the output circuit being electrically coupled to the reference point and being configured to output touch signals to the corresponding data output line; and a reset circuit disposed on the substrate and in the breach, the reset circuit being electrically coupled to the reference point so as to reset the reference point to a predetermined electric potential when the touch sensing unit is out of working;

wherein when the touch sensing unit is controlled to perform the touch sensing action by the corresponding scan line, the output circuit determines whether to transmit the electric potential of the corresponding scan line to the corresponding data output line according to electric potential of the reference point;

wherein the output circuit comprises:

a first transistor having a gate, a first drain/source and a second drain/source, the gate of the first transistor being electrically coupled to the reference point, and the first drain/source of the first transistor being electrically coupled to the corresponding scan line; and a second transistor having a gate, a first drain/source and a second drain/source, the gate of the second transistor being electrically coupled to the corresponding scan line, the first drain/source of the second transistor being electrically coupled to the corresponding data output line, and the second drain/source of the second transistor being electrically coupled to the second drain/source of the first transistor.

2. The touch panel according to claim 1, wherein the reset circuit comprising:

a unilateral conducting component having a first terminal and a second terminal, the unilateral conducting component allowing electric current to flow from the first terminal to the second terminal, the first terminal of the unilateral conducting component being electrically coupled to the reference point, and the second terminal being electrically coupled to the corresponding scan line.

3. The touch panel according to claim 2, wherein the unilateral conducting component is implemented by a diode-connected transistor.

4. The touch panel according to claim 1, wherein material of the first conducting line is different from material of the sensing electrode.

5. The touch panel according to claim 4, further comprising an insulation layer disposed between the first conducting line and the sensing electrode, wherein the insulation layer has a via hole, and the first conducting line is electrically connected to the sensing electrode through the via hole.

6. The touch panel according to claim 1, further comprising an insulation layer disposed between the first conducting line and the sensing electrode, wherein the insulation layer has a via hole, and the first conducting line is electrically connected to the sensing electrode through the via hole.

* * * * *